(12) United States Patent  (10) Patent No.: US 8,596,657 B1
Liu  (45) Date of Patent: Dec. 3, 2013

(54) PUSH CART

(76) Inventor: Cheng-Hsuan Liu, Tainan (TW)

( * ) Notice: Subject to any disclaimer, the term of this patent is extended or adjusted under 35 U.S.C. 154(b) by 0 days.

(21) Appl. No.: 13/572,733

(22) Filed: Aug. 13, 2012

(51) Int. Cl.
*B62B 3/02* (2006.01)
*B65F 1/06* (2006.01)
*B62B 3/00* (2006.01)

(52) U.S. Cl.
CPC ............... *B65F 1/062* (2013.01); *B62B 3/001* (2013.01); *B62B 3/02* (2013.01)
USPC ..................................................... 280/79.11

(58) Field of Classification Search
USPC .................. 280/47.11, 98, 79.11, 103, 30
See application file for complete search history.

(56) References Cited

U.S. PATENT DOCUMENTS

| | | | | |
|---|---|---|---|---|
| 2,604,333 A | * | 7/1952 | Elmer | 280/37 |
| 3,084,947 A | * | 4/1963 | Booth | 280/11 |
| 4,364,490 A | * | 12/1982 | Lang et al. | 220/495.07 |
| 5,407,218 A | * | 4/1995 | Jackson | 280/30 |
| 5,480,170 A | * | 1/1996 | Kaiser, II | 280/30 |
| 5,857,695 A | * | 1/1999 | Crowell | 280/651 |
| 6,508,479 B1 | * | 1/2003 | Tseng | 280/47.34 |
| 6,971,697 B2 | * | 12/2005 | Morales | 296/37.1 |
| 7,963,530 B1 | * | 6/2011 | Garcia | 280/30 |
| 8,191,907 B2 | * | 6/2012 | Watson | 280/30 |
| 2007/0262082 A1 | * | 11/2007 | Butcher | 221/47 |

* cited by examiner

*Primary Examiner* — John R Olszewski
*Assistant Examiner* — Brian Cassidy
(74) *Attorney, Agent, or Firm* — Alan Kamrath; Kamrath IP Lawfirm, P.A.

(57) ABSTRACT

A push cart includes a lid removably covering a receiving space in the base. The lid includes a slit in communication with the receiving space. A handlebar is mounted to an end of the base. A container is removably placed on the lid. The container includes a peripheral wall and an open top end. The container further includes a bottom opposite to the open top end. The bottom of the container has an opening aligned with the slit. A plurality of bags is coiled and received in the receiving space, with a closed end of each bag interconnected to and separable from an open end of an adjacent bag. A portion of the coiled bags is extended through the slit and the opening of the container, with the outermost bag received in the container, with the open end of the outermost bag retained to the peripheral wall of the container.

7 Claims, 19 Drawing Sheets

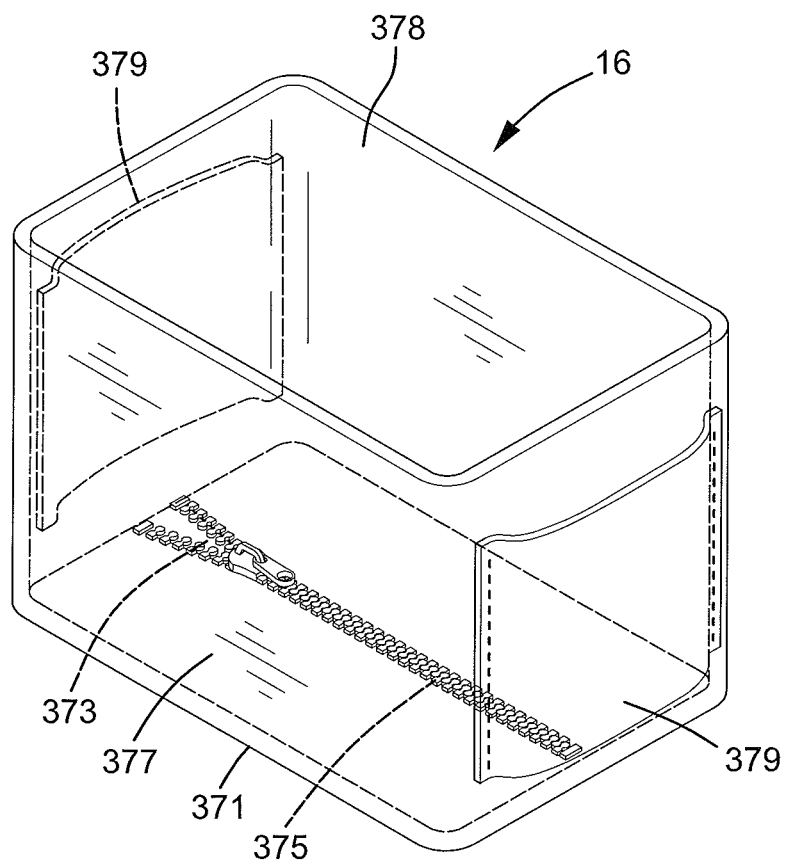
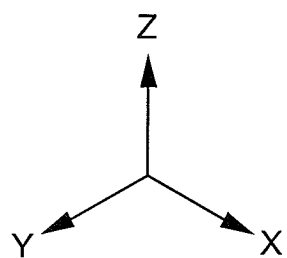
FIG. 10

PUSH CART

BACKGROUND OF THE INVENTION

The present invention relates to a push cart and, more particularly, to a push cart capable of stably carrying articles and serving as a pet cart, shopping cart, or walker cart.

A push cart generally includes a base and wheels rotatably mounted to a bottom side of the base. A handle is mounted on an end of the base on which articles are placed. A user can grip the handle to push or pull the push cart for transporting the articles. However, the articles are not positioned and, thus, apt to fall from the base.

In an approach, a side frame is provided on each of two lateral sides of the base to prevent the articles from falling. However, the resultant push cart is bulky and occupies a larger space, and the height of the side frames hinders removal of the articles.

Conventional push carts are not handy and are different from walker carts that can assist the aged in walking. Furthermore, a user using a push cart often forgets to bring bags or shopping bags that are separate from the push cart.

Thus, a need exists for a novel push cart that can serve as a pet cart, a shopping cart, or even a walker cart while preventing falling of articles on the push cart.

BRIEF SUMMARY OF THE INVENTION

The present invention solves this need and other problems in the field of reliable multi-functional push carts by providing a push cart including a base having first and second ends spaced along a first axis, two lateral sides spaced from each other along a second axis perpendicular to the first axis, and top and bottom sides spaced along a third axis perpendicular to the first and second axes, with a receiving space defined in the top side of the base. The base is supported by two first wheels and two second wheels, with the two first wheels located adjacent to the first end of the base, with the two second wheels located adjacent to the second end of the base. The first and second wheels are rotatable to move the push cart. A lid is removably mounted to the base and covers the receiving space. The lid includes a slit in communication with the receiving space. A guard member is mounted to the second end of the base. A handlebar is mounted to the first end of the base. A handgrip is fixed to the handlebar. A container is removably placed on the lid. The container includes a peripheral wall and an open top end. The container further includes a bottom opposite to the open top end. The bottom of the container has an opening aligned with the slit of the lid. A plurality of bags is coiled and received in the receiving space of the base. Each bag includes a closed end and an open end, with the closed end of each bag interconnected to and separable from the open end of an adjacent bag. A portion of the coiled bags is extended through the slit of the lid and the opening of the container, with the outermost bag received in the container, with the open end of the outermost bag retained to the peripheral wall of the container.

In a form shown, the base includes a compartment defined in the top side. The receiving space is defined in a bottom wall of the compartment. The receiving space has a bottom wall and a peripheral wall extending perpendicularly to the bottom wall of the receiving space. A lip is formed on the peripheral wall of the receiving space and located between the bottom wall of the compartment and the bottom wall of the receiving space. The lid is removably received in the compartment and rests on the lip.

In the form shown, a column is formed on the bottom side of the base and located adjacent to the first end of the base. The column includes a periphery having positioning hole. A seat is mounted to the bottom side of the base. The seat includes an engagement portion and a shaft coupling portion. The shaft coupling portion has an outer face. The first wheels are rotatably mounted to the shaft coupling portion. The engagement portion includes a tubular portion having a radial hole. A through-hole extends from the outer face of the shaft coupling portion to the radial hole of the tubular portion. The tubular portion pivotably receives the column of the base. A positioning rod is slideably received in the through-hole of the seat. The positioning rod includes an inner end received in the radial hole of the seat and an outer end outside of the seat. A push plate is mounted to the outer end of the positioning rod and pivotable relative to the positioning rod between a first position and a second position. The push plate includes a first surface and a second surface extending perpendicularly to the first surface. When the push plate is in the first position, the first surface abuts against the shaft coupling portion, and the inner end of the positioning rod is disengaged from the positioning hole of the column of the base, allowing the seat to pivot relative to the base about a pivot axis defined by the column. When the push plate is in the second position, the second surface abuts against the shaft coupling portion, and the inner end of the positioning rod is engaged with the positioning hole of the column of the base, preventing the seat from pivoting relative to the base.

In the form shown, the handlebar includes a stationary tube having upper and lower ends. The lower end of the stationary tube is fixed to the base. A sliding tube includes an upper section and a lower section received in the stationary tube. The sliding tube is slideable relative to the stationary tube along the third axis. The handgrip is fixed on the upper section of the sliding tube outside of the stationary tube. The lower section includes a plurality of adjustment holes spaced along the third axis. First and second housings are fixed around the upper end of the stationary tube. The second housing includes a peg hole. A press button is pivotably mounted to the second casing and includes a peg on an inner face thereof. The peg is received in the peg hole of the second housing. The press button is pivotable between an engagement position and a disengagement position. When the press button is in the engagement position, the peg is engaged in one of the adjustment holes aligned with the peg hole, preventing the sliding tube from sliding relative to the stationary tube along the third axis. When the press button is in the disengagement position, the peg is disengaged from the adjustment holes, allowing the sliding tube to slide relative to the stationary tube along the third axis.

In the form shown, the upper section of the sliding tube includes a radial hole. A positioning casing is mounted to the upper section of the sliding tube and includes a chamber. A control bar includes a pivotal portion pivotably received in the chamber of the positioning casing. The control bar further includes a through-opening delimited by a peripheral wall having an operative face with a chamfered section. The control bar is pivotable relative to the positioning casing between a releasing position, a braking position, and a parking position. An arm is received in the chamber of the positioning casing and includes first and second ends outside of the control bar. The first end of the arm is pivotably connected to the positioning casing. The arm further includes an intermediate section between the first and second ends of the arm and received in the through-opening of the control bar. The intermediate section of the arm includes a notch facing the operative face of the control bar. An end of each of first and second braking levers is pivotably mounted to the bottom side of the base. A spring is mounted between the first and second braking levers and biases the other end of each of the first and second braking levers away from the second wheels. A cable includes an upper end fixed to the second end of the arm. The cable extends through the radial hole of the sliding tube and extends through the sliding tube. The cable further includes a lower end fixed to the first and second braking levers.

When the control bar is in the releasing position, the other ends of the first and second braking levers are spaced from the two second wheels. A first spacing between the second end of the arm and the sliding tube while the control bar is in the releasing position is smaller than a second spacing between the second end of the arm while the control bar is in the braking or parking position.

When the control bar is moved to the parking position, the first and second braking levers pivot to compress the spring, and the other ends of the first and second braking levers press against the second wheels to brake the push cart. The other ends of the first and second braking levers disengage from the second wheels under the action of the spring if the control bar is released.

When control bar is in the parking position, the notch of the arm is engaged with the chamfered section of the control bar. The other ends of the first and second braking levers press against the two second wheels to park the push cart. The spring is incapable of moving the other ends of the first and second braking levers to disengage from the second wheels if the control bar is released.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 10 shows a perspective view of a container.

Figure 1:
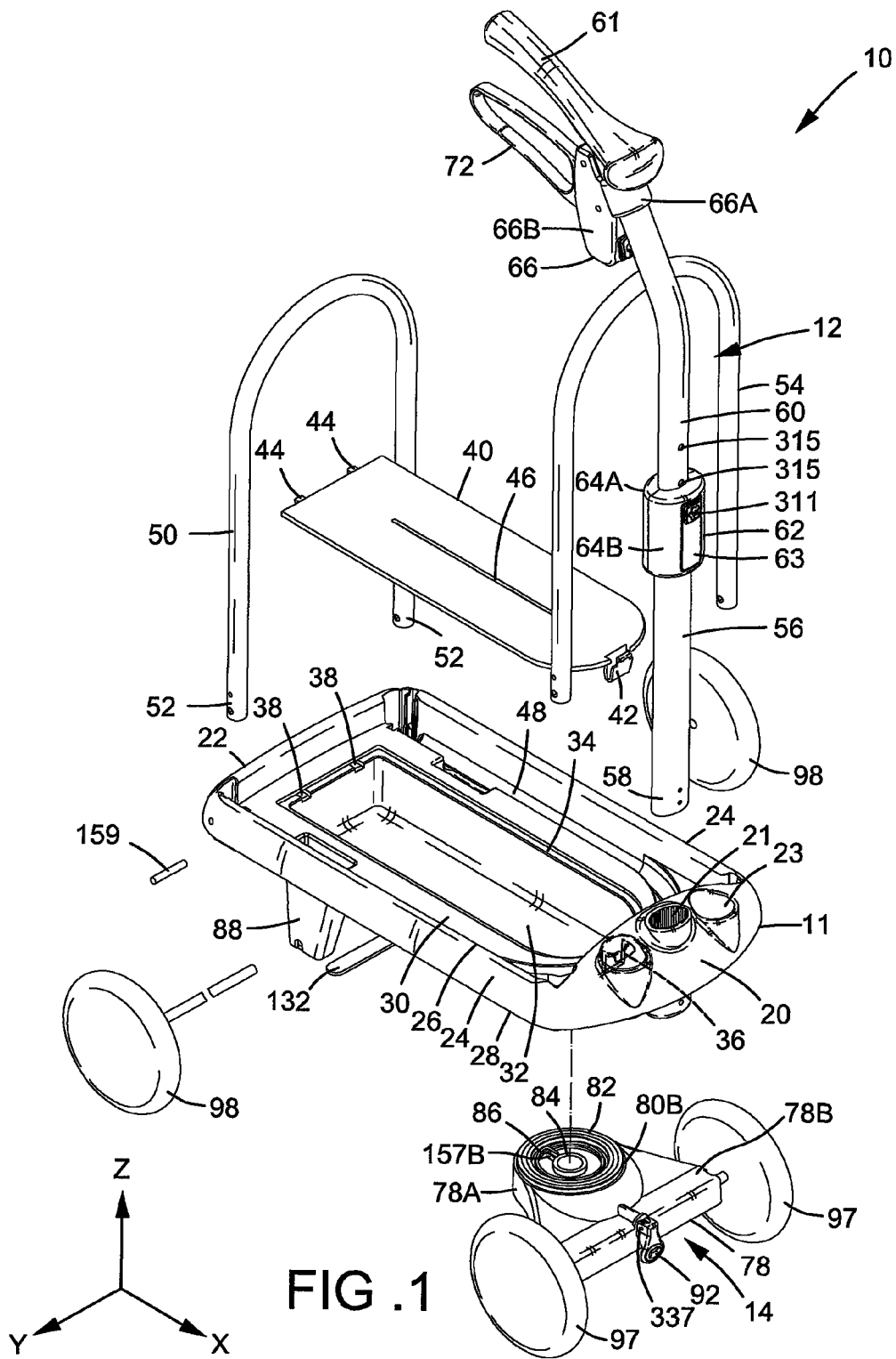
FIG. 1 shows an exploded, top, perspective view of a push cart according to the present invention.
Figure 2:
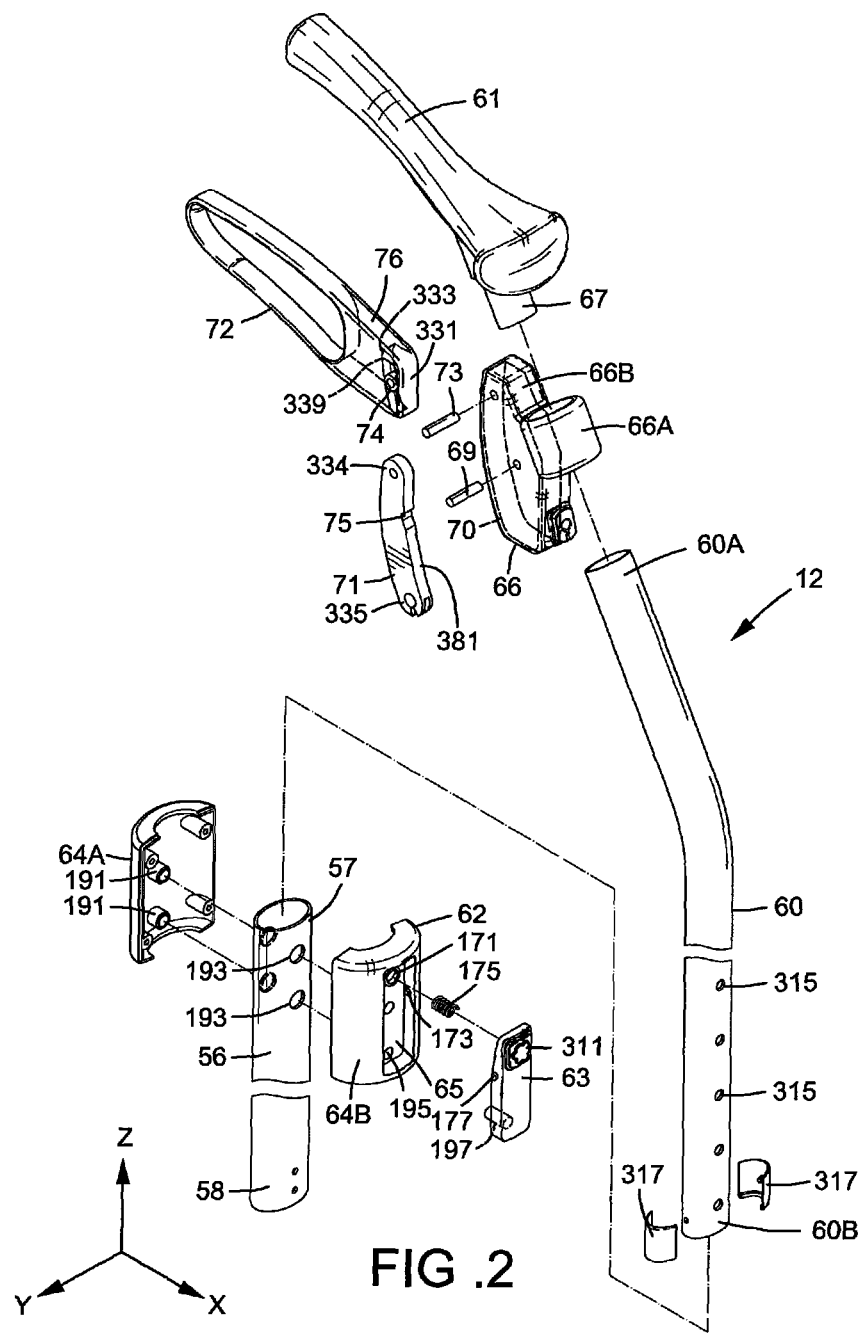
FIG. 2 shows an exploded, perspective view of a handlebar of the push cart of FIG. 1.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "lower", "upper", "top", "bottom", "inner", "outer", "side", "end", "portion", "section", "spacing", "height", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

A push cart according to the present invention is shown in the drawings and generally designated 10. Push cart 10 includes a base 11 having first and second ends 20 and 22 spaced from each other along a first axis X. Base 11 further includes two lateral sides 24 spaced from each other along a second axis Y perpendicular to first axis X. Base 11 further includes top and bottom sides 26 and 28 spaced from each other along a third axis Z perpendicular to first and second axes X and Y. A compartment 30 is defined in top side 26 of base 11 and has a bottom wall. A receiving space 32 is defined in the bottom wall of compartment 30. Receiving space 32 includes a peripheral wall extending perpendicularly to the bottom wall of receiving space 32. A lip 34 is formed on the peripheral wall of receiving space 32 and located between the bottom wall of compartment 30 and the bottom wall of receiving space 32. A first engagement groove 36 is formed in lip 34 and located adjacent to first end 20. Two second engagement grooves 38 are formed in lip 34 and located adjacent to second end 22. A substantially U-shaped insertion groove 48 is defined in the bottom wall of compartment 30 and surrounds receiving space 32. A column 111 is formed on bottom side 28 of base 11 and located adjacent to first end 20. A positioning hole 113 is defined in a periphery of column 111.

A collar 155 is formed on bottom side 28 of base 11. Two wheel brackets 88 are mounted on bottom side 28 of base 11, with each wheel bracket 88 located between collar 155 and second end 22 along first axis X. A wheel 98 is rotatably mounted to each wheel bracket 88. Collar 155 is located between each wheel bracket 88 and column 111 along first axis X. Two stops 157A are mounted on bottom side 28 of base 11 and located adjacent to column 111. An annular groove 80A is defined in bottom side 28 of base 11 and surrounds column 111 and stops 157A. A hole 21 and two grooves 23 are defined in top side 26 and located in first end 20 of base 11, with hole 21 located between grooves 23 along second axis Y. Grooves 23 can receive articles, such as umbrellas, sticks, etc.

In the form shown, a lid 40 is removably received in compartment 30 of base 11 to cover receiving space 32, with lid 40 resting on lip 34. Lid 40 includes upper and lower faces spaced along third axis Z and a periphery extending between the upper and lower faces. A slit 46 extends from the upper face through the lower face of lid 40. A resilient engaging plate 42 and two protrusions 44 are provided on the periphery of lid 40. Resilient engaging plate 42 is releasably engaged with first engagement groove 36 of base 11. Each protrusion 44 is engaged in one of second engagement grooves 38 of base 11.

Figure 5:
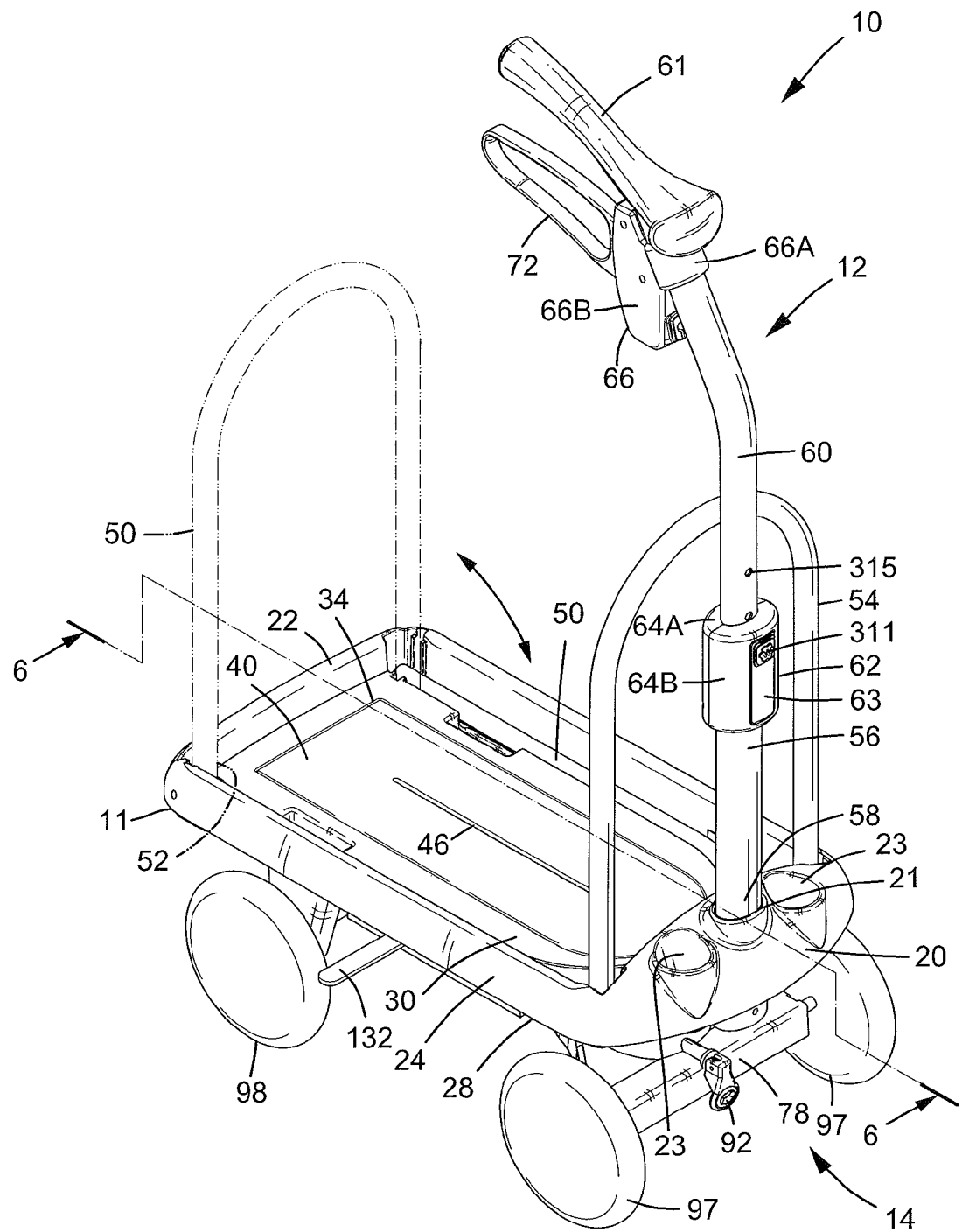
FIG. 5 shows a perspective view of the push cart of FIG. 1.

In the form shown, a substantially U-shaped guard member 50 pivotably mounted to base 11. Guard member 50 includes two distal ends 52 received in insertion groove 48, with a pin 159 extending through each distal end 52 into base 11, allowing guard member 50 to pivot about a pivot axis defined by pins 159 between an upright position (see phantom lines in FIG. 5) perpendicular to first axis X and a storage position (see solid lines in FIG. 5) received in insertion groove 48. A substantially U-shaped auxiliary guard member 54 is mounted on top side 26 of base 11 and includes two distal ends fixed in compartment 30 and located adjacent to first end 20 of base 11. Auxiliary guard member 54 is spaced from guard member 50 along first axis X.

Figure 6:
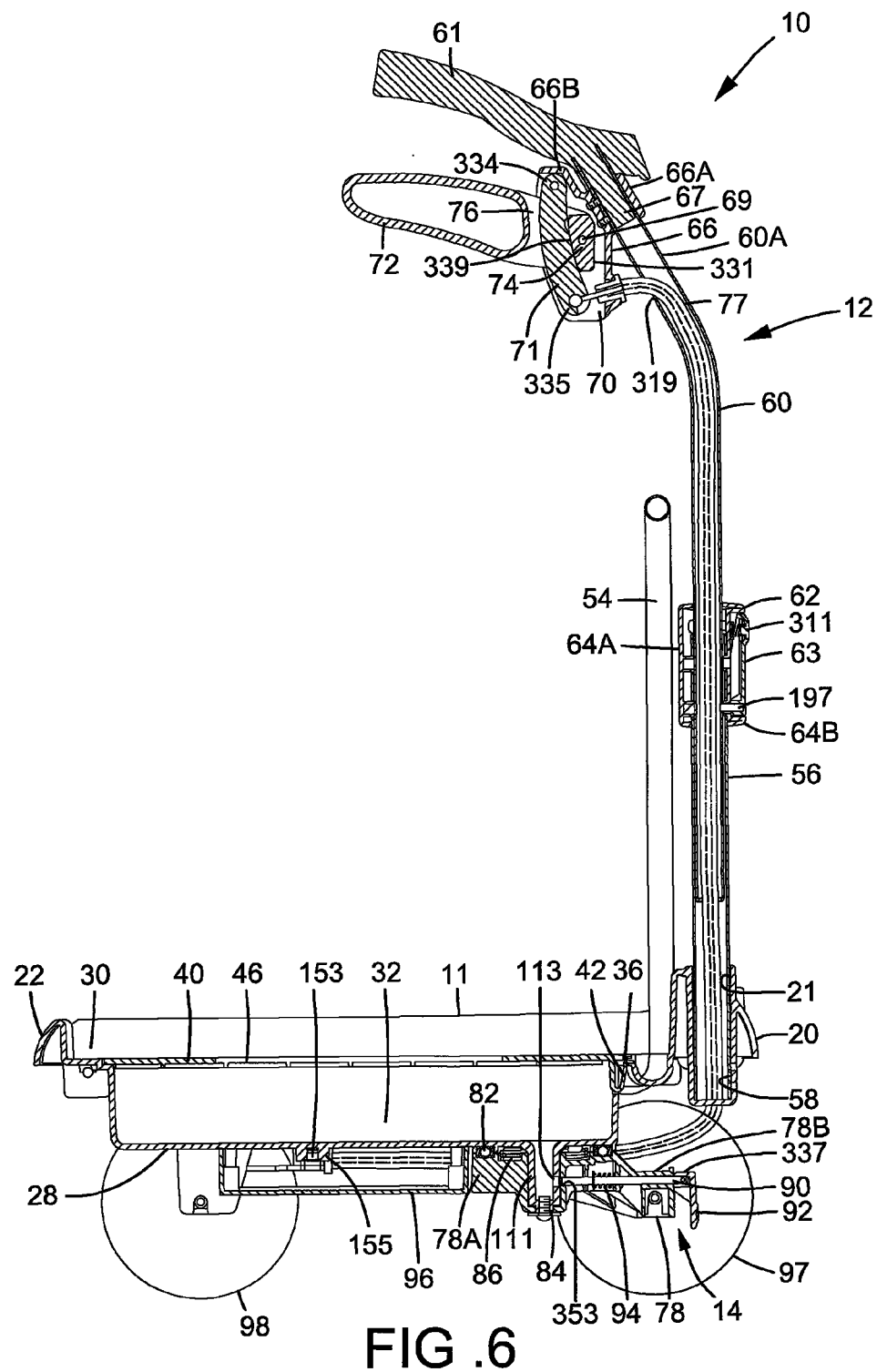
FIG. 6 shows a cross sectional view taken along section line 6-6 of FIG. 5.
Figure 14:
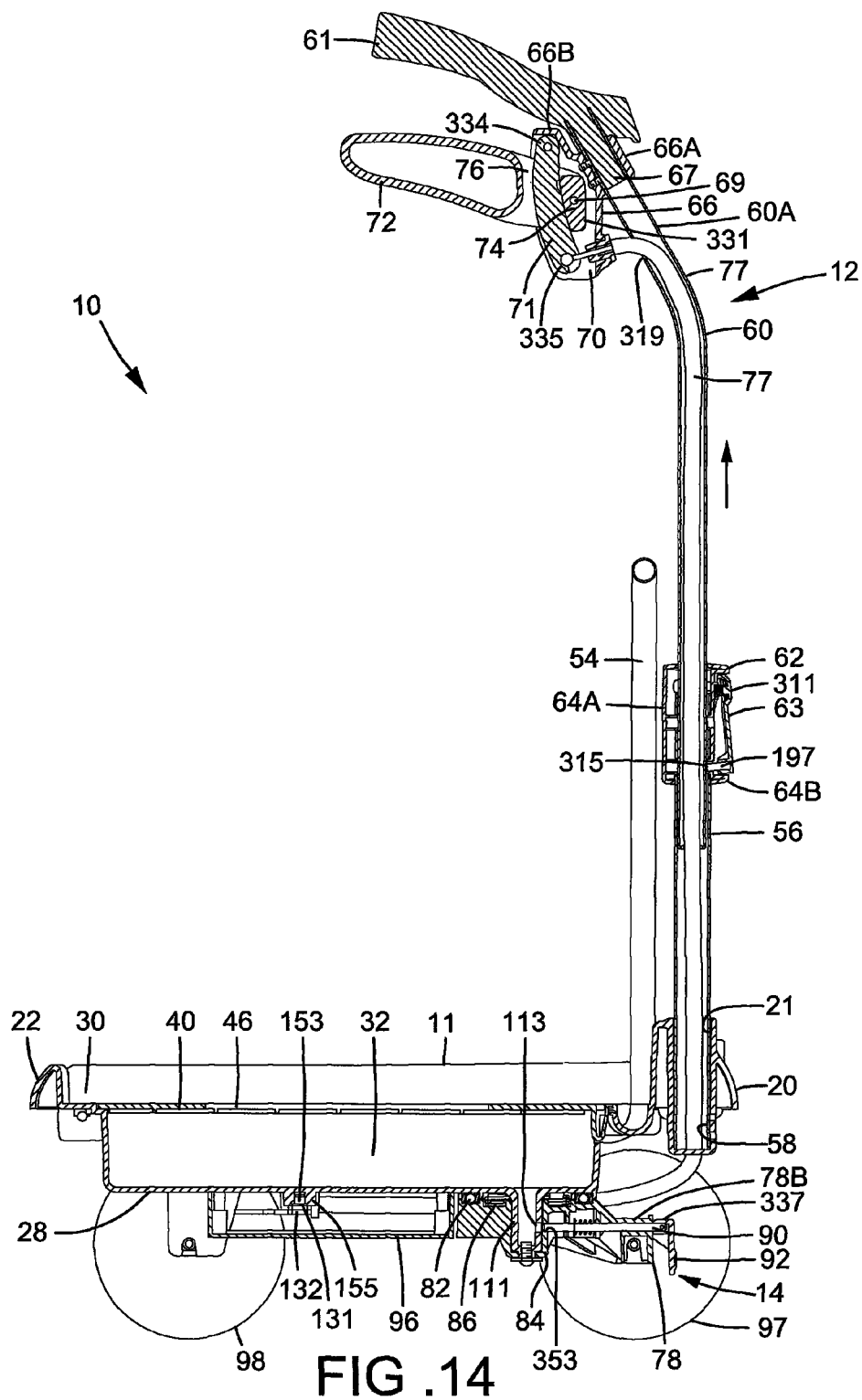
FIG. 14 shows a cross sectional view taken along section line 13-13 of FIG. 9B and similar to FIG. 6, with the handlebar in an extended state.

In the form shown, push cart 10 further includes a handlebar 12 including a stationary tube 56 having upper and lower ends 57 and 58. Stationary tube 56 includes four fixing holes 193 located adjacent to upper end 57 of stationary tube 56. Lower end 58 of stationary tube 56 is fixed in hole 21 of base 11. Handlebar 12 further includes a sliding tube 60 having upper and lower sections 60A and 60B. A radial hole 319 is defined in upper section 60A. A plurality of adjustment holes 315 is defined in lower section 60B and spaced from each other along third axis Z. A lower end of lower section 60B is covered by two clamping plates 317. Lower section 60B of sliding tube 60 is slideably received in stationary tube 56. Since the outer diameter of clamping plates 317 fixed to the lower end of lower section 60B is slightly smaller than an inner diameter of stationary tube 56, sliding tube 60 can slide relative to stationary tube 56 along third axis Z between an extended position (FIG. 14) and a shortened position (FIG. 6). The articles, such as umbrellas or sticks, can be tied to stationary tube 56 or sliding tube 60 by a strap or hook and loop fasteners.

Figure 3:
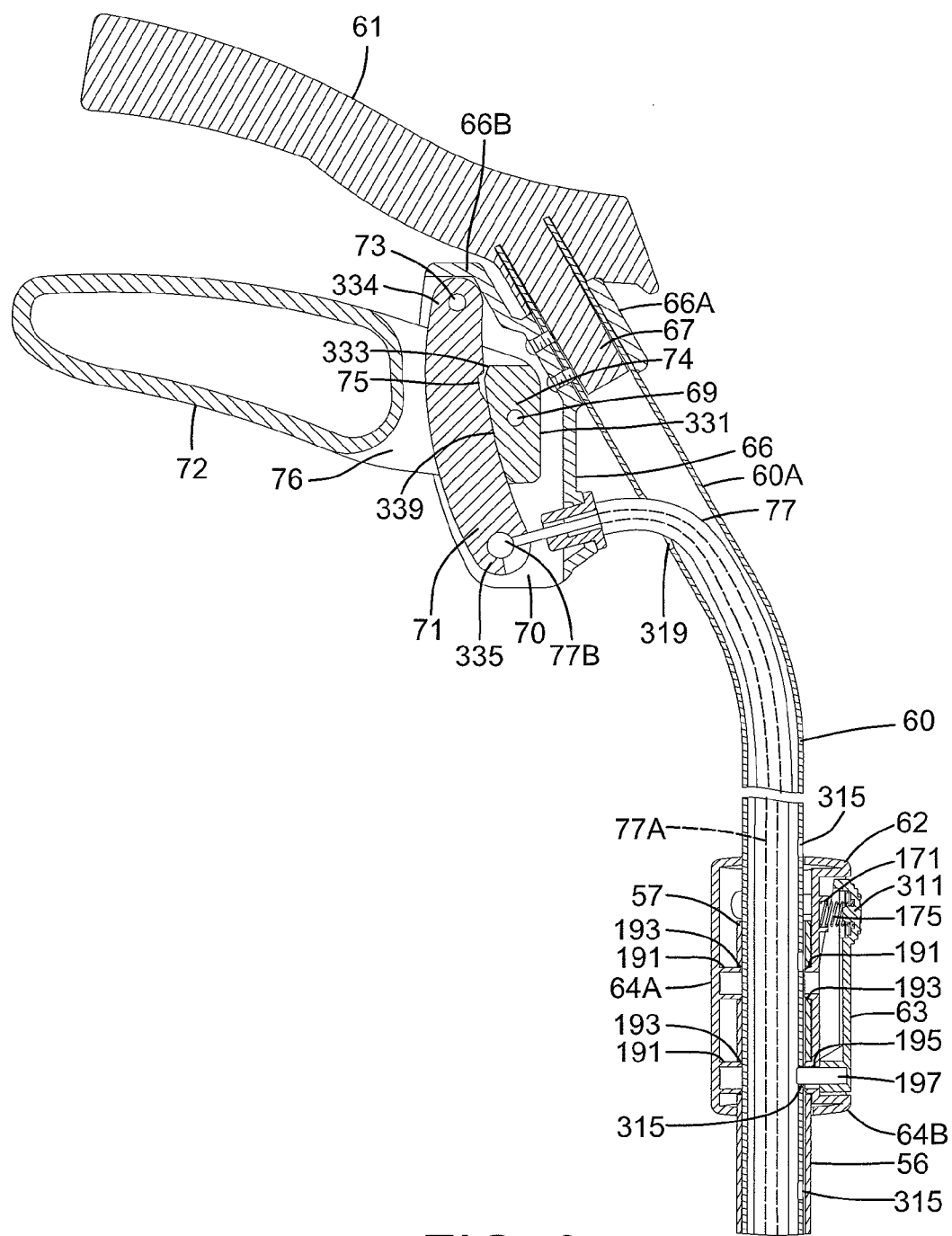
FIG. 3 shows a cross sectional view of the handlebar of the push cart of FIG. 1, with a control bar in a releasing position.
Figure 4:
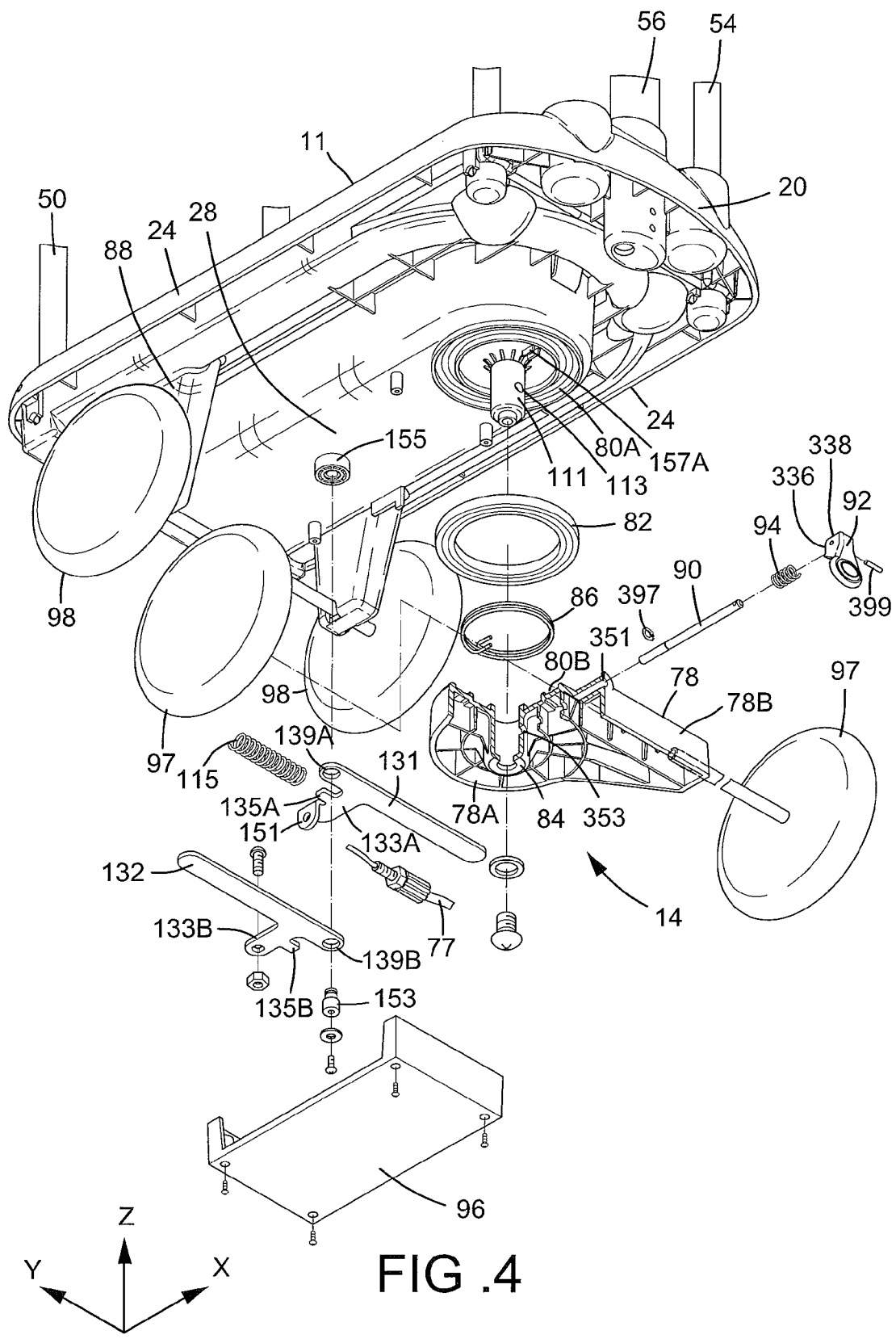
FIG. 4 shows an exploded, bottom, exploded perspective view of the push cart of FIG. 1.

In the form shown, handlebar 12 further includes a fixing member 62 fixed to upper end 57 of stationary tube 56. Fixing member 62 includes first and second housings 64A and 64B each having an inner periphery on which two fixing pins 191 are formed. Second housing 64B further includes a recess 65 in an outer face thereof. Recess 65 includes a peripheral wall and a bottom wall extending perpendicularly to the peripheral wall, with two pivot holes 173 defined in two lateral faces of the peripheral wall. A socket 171 is defined in the bottom wall of recess 65. A peg hole 195 extends from the bottom wall of recess 65 through an inner face of recess 65 opposite to the outer face of recess 65. First and second housings 64A and 64B are mounted to and cover upper end 57 of stationary tube 56 by screws. Fixing pins 191 of first and second housings 64A and 64B engage with fixing holes 193 of stationary tube 56. Thus, upper end 57 of stationary tube 56 is received in first and second housings 64A and 64B (FIG. 3). Lower section 60B of sliding tube 60 extends through an upper opening of fixing member formed by first and second housings 64A and 64B into stationary tube 56. Peg hole 195 of second housing 64B is aligned with one of adjustment holes 315 of sliding tube 60. When sliding tube 60 slides upward in stationary tube 56 along third axis Z, clamping plates 317 are stopped by a bottom end of fixing member 62, avoiding disengagement of sliding tube 60 from stationary tube 56.

In the form shown, fixing member 62 further includes a press button 63 pivotably received in recess 65. Press button 63 includes two pivotal points 177 on two lateral walls thereof, dividing press button 63 into a pressing portion 311 on an upper section of press button 63. A peg 197 is formed on an inner face of press button 63 and located outside of pressing portion 311. Each pivotal point 177 is pivotably received in one of pivotal holes 173 of recess 65 of second housing 64B. Peg 197 is engaged in peg hole 195 of recess 65 of second housing 64B. A spring 175 is mounted between the inner face of press button 63 and socket 171 of recess 64 of second housing 64B. Spring 175 biases press button 63, causing peg 197 to extend into one of adjustment holes 315 aligned with peg hole 195. Thus, sliding tube 60 can not move along third axis Z. Press button 63 can be pressed at pressing portion 311 to pivot about a pivot axis defined by pivotal points 177 between an engagement position and a disengagement position.

In the form shown, handlebar 12 further includes a positioning casing 66 mounted to sliding tube 60. Positioning casing 66 includes a casing 66B and a sleeve 66A formed on an outer face of casing 66B. Casing 66B includes a chamber 70. Sleeve 66A is fixed to and receives upper section 60A of sliding tube 60.

In the form shown, handlebar 12 further includes a control bar 72 having a pivotal portion 74 pivotably connected to positioning casing 66. Pivotal portion 74 includes an upper and lower faces spaced along third axis Z and an end face 331 extending between the upper and lower faces. A through-opening 76 extends from the upper face through the lower face of pivotal portion 74 and spaced from end face 331. Through-opening 76 is delimited by a peripheral wall including an operative face 339 having a chamfered section 333. The pivotal portion 74 of control bar 72 is received in chamber 70 of positioning casing 66, with a first pin 69 extending through casing 66B and pivotal portion 74, allowing control bar 72 to pivot about a pivot axis defined by first pin 69 between a releasing position, a braking position, and a parking position.

In the form shown, an arm 71 is pivotably received in chamber 70 of positioning casing 66. Arm 71 includes first and second ends 334 and 335 spaced along third axis Z. An intermediate section between first and second ends 334 and 335 of arm 71 is received in through-opening 76 of control bar 72, with first and second ends 334 and 335 of arm 71 located outside of control bar 72 (FIG. 3). The intermediate section of arm 71 includes a notch 75 facing operative face 339 of control bar 72. A second pin 73 extends through casing 66B and first end 334 of arm 71. When control bar 72 pivots between the releasing position, braking position, and parking position, operative face 339 of control bar 72 presses against a lateral face 381 of arm 71, causing arm 71 to pivot about a pivot axis defined by second pin 73. Notch 75 is defined in lateral face 381 in the form shown. A first spacing between second end 335 of arm 71 and sliding tube 60 while control bar 72 is in the releasing position is smaller than a second spacing between second end 335 of arm 71 while control bar 72 is in the braking or parking position.

In the form shown, handlebar 12 further includes a handgrip 61 having a coupler 67 attached to a distal end of upper section 60A of sliding tube 60.

In the form shown, push cart 10 further includes a wheel assembly 14 mounted to bottom side 28 of base 11. Wheel assembly 14 includes a seat 78 having an engagement portion 78A and a shaft coupling portion 78B on an outer periphery of engagement portion 78A. Engagement portion 78A includes an upper face and a tubular portion 84. Two stops 157B are formed on the upper face of engagement portion 78A and face stops 157A. An annular groove 80B is defined in the upper face of engagement portion 78A and surrounds each stop 157B and is aligned with annular groove 80A of base 11. Tubular portion 84 further includes a radial hole 353 extending from an inner periphery through an outer periphery of tubular portion 84. A through-hole 351 extends from an outer face of shaft coupling portion 78B to radial hole 353.

Figure 9A:
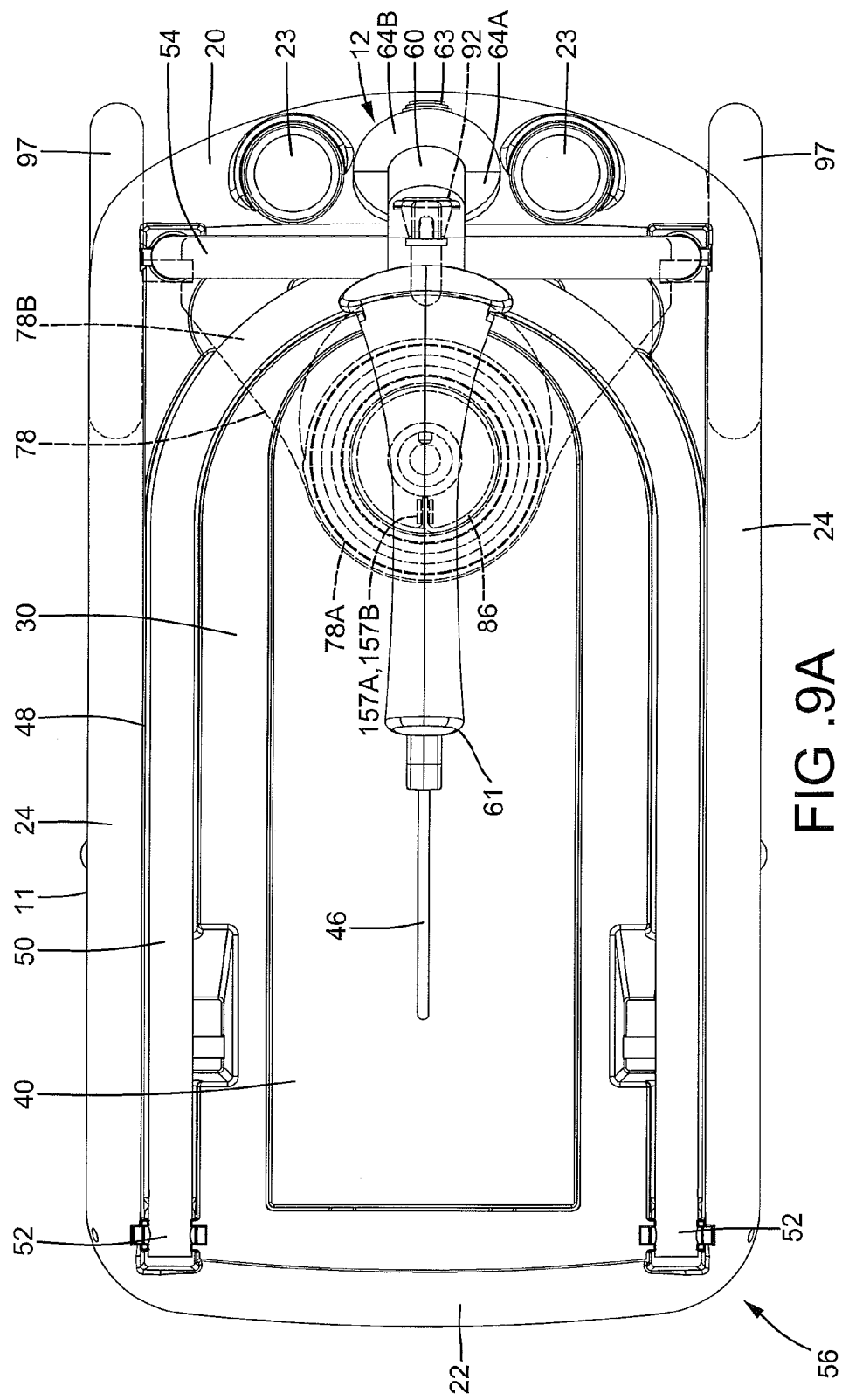
FIG. 9A shows a top view of the push cart of FIG. 5.

Tubular portion 84 of seat 78 pivotably receives column 111 of base 11. A bearing 82, such as a thrust bearing, is mounted in annular groove 80A of base 11 and annular groove 80B of seat 78. A torsion spring 86 is surrounded by bearing 82 and includes a tang attached to stops 157A. The other tang of torsion spring 86 is attached to stops 157B. A pair of wheels 97 is mounted on opposite sides of shaft coupling portion 78B. Torsion spring 86 biases seat 78 to a position in which radial hole 353 is aligned with positioning hole 113 such that wheels 97 are aligned with wheels 98 (FIG. 9A). Wheels 97 and 98 support base 11 on the ground, a floor surface, or the like and are rotatable to move push cart 10 along the ground or floor surface.

In the form shown, wheel assembly 14 further includes a positioning rod 90 slideably received in through-hole 351 of seat 78. A push plate 92 includes a push portion 337 having a first surface 336 and a second surface 338 extending perpendicularly to first surface 336. A pivot pin 399 extends through an outer end of positioning rod 90 and push portion 337, allowing push plate 92 to pivot relative to positioning rod 90 about a pivot axis defined by pivot pin 399 between a first position and a second position. An inner end of positioning rod 90 is received in radial hole 353 of seat 78. A retainer ring 397 is mounted around an outer periphery of positioning rod 90. A spring 94 is mounted between retainer ring 397 and an inner face of seat 78. Spring 94 biases positioning rod 90 towards positioning hole 113 of column 111. When push plate 92 pivots between the first position (in which first surface 336 abuts an outer face of shaft coupling portion 78B) and the second position (in which second surface 338 abuts the outer face of shaft coupling portion 78B), positioning rod 90 moves away from or towards positioning hole 113 of column 111 along first axis X.

In the form shown, push cart 10 further includes a first braking lever 131 and a second braking lever 132. An extension 133A extends from a lateral side of first braking lever 131 and has a protrusion 135A and a bend 151, with protrusion 135A parallel to and spaced from the lateral side of first braking lever 131. First braking lever 131 includes a pivotal end 139A located adjacent to extension 133A. An extension 133B extends from a lateral side of second braking lever 132 and has a protrusion 135B parallel to and spaced from the lateral side of second braking lever 132. Second braking lever 132 includes a pivotal end 139B located adjacent to extension 133B.

Figure 9B:
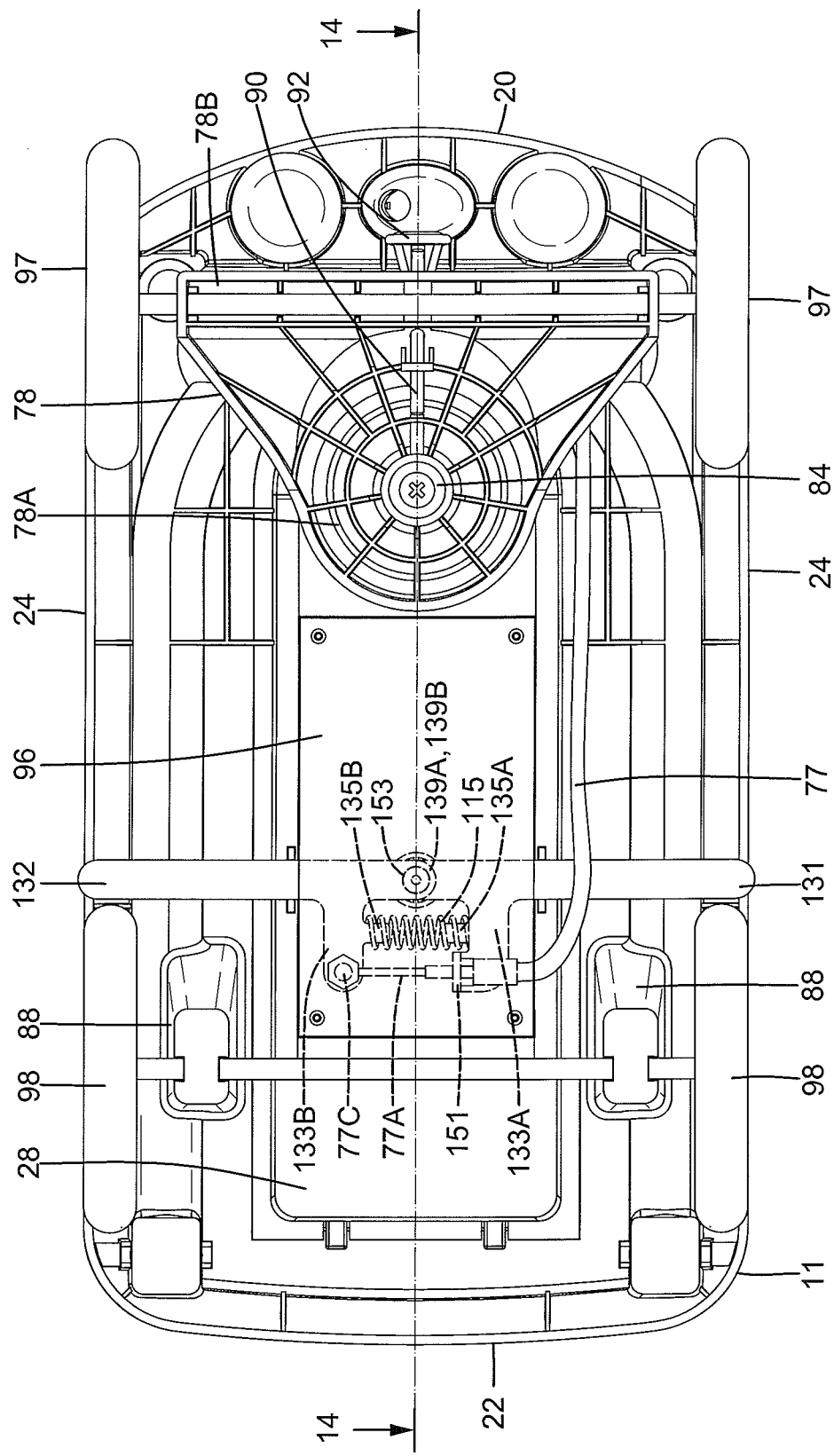
FIG. 9B shows a bottom view of the push cart of FIG. 5.

First and second braking levers 131 and 132 are aligned with each other, with pivotal ends 139A and 139B overlapped with each other. A stub 153 extends through pivotal ends 139A and 139B of first and second braking levers 131 and 132 and engages with collar 155 of base 11, allowing first and second braking levers 131 and 132 to pivot about a pivot axis defined by stub 153 to engage with or disengage from wheels 98. A cable 77A includes an upper end 77B extending through stationary tube 56 and radial hole 319 of sliding tube 60 and fixed to second end 335 of arm 71. Cable 77A further includes a lower end 77C fixed to extension 133B of second braking lever 132. Cable 77A is received in a sheath 77. A portion of sheath 77 adjacent to lower end 77C of cable 77A is fixed to bend 151 of first braking lever 131 (FIG. 9B). First and second braking levers 131 and 132 pivot when cable 77A is pulled by arm 71, moving the other ends of first and second braking levers 131 and 132 towards wheels 98. A spring 115 is mounted between protrusions 135A and 135B of first and second braking levers 131 and 132. Spring 115 biases the other ends of first and second braking levers 131 and 132 to a position spaced from wheels 98.

In the form shown, a cover 96 is mounted to bottom side 28 of base 11 to shield first and second braking levers 131 and 132.

A plurality of bags 391, such as plastic bags, can be placed in receiving space 32 of base 11. Each bag 391 includes an open end 395 and a closed end 393 connected to open end 395 of an adjacent bag 391. Two adjacent bags 391 can be separated from each other by tearing along perforations defined in an interconnection area between closed end 393 and open end 395 of two adjacent bags 391. Bags 391 are coiled.

Figure 11:
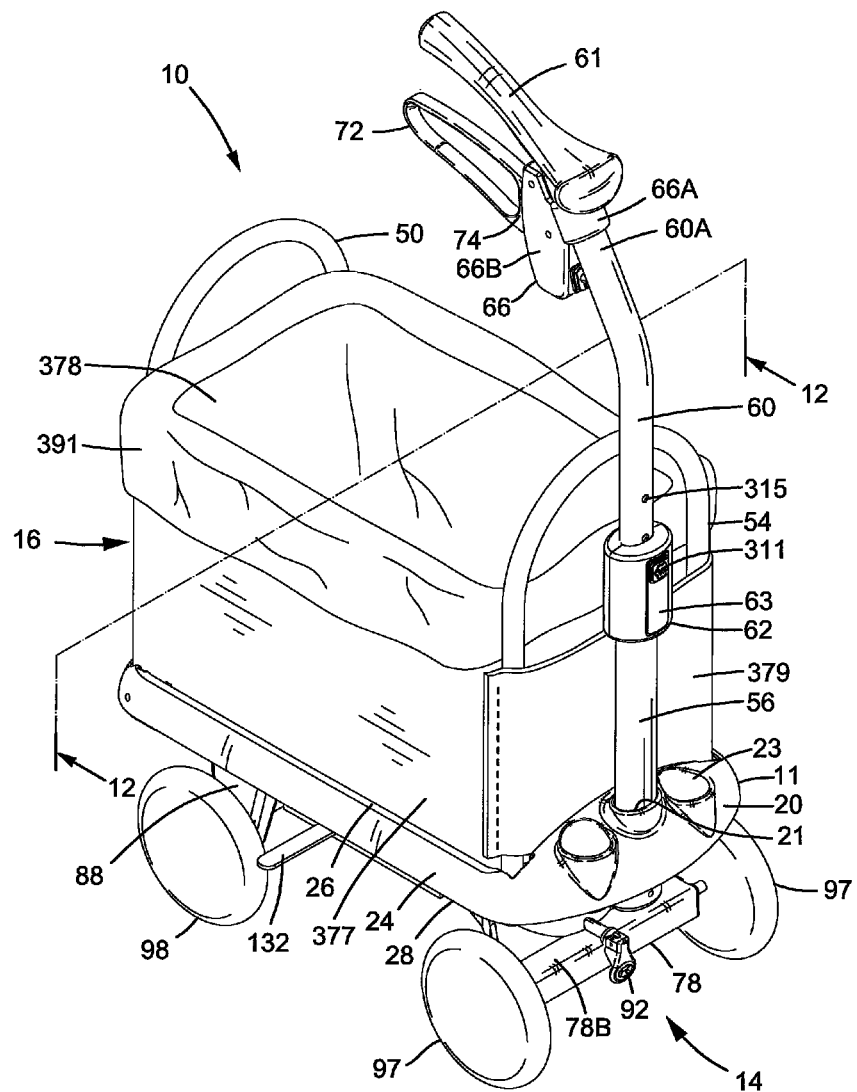
FIG. 11 shows a perspective view of the push cart of FIG. 5, with the container placed on the push cart.
Figure 12:
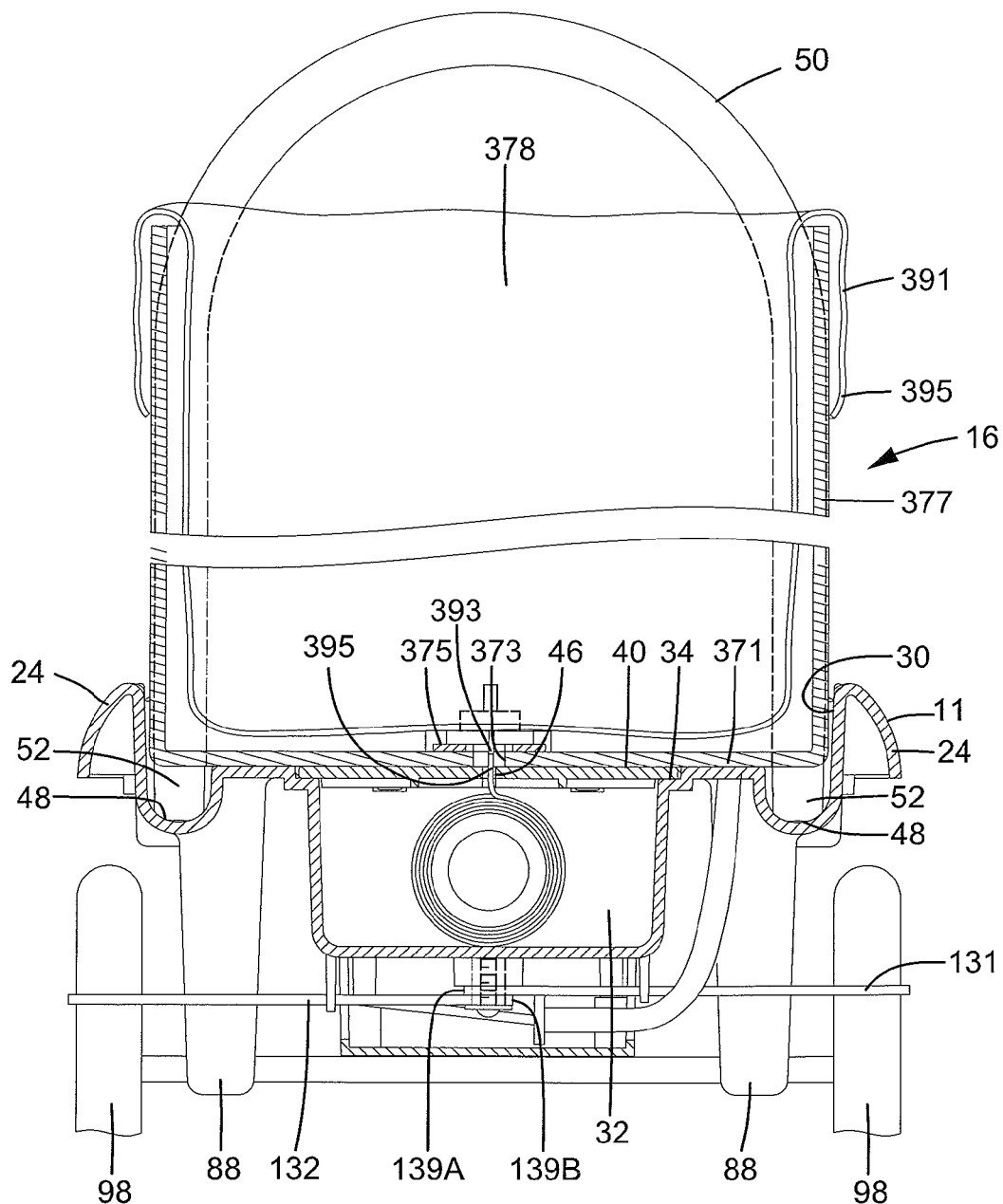
FIG. 12 shows a cross sectional view taken along section line 12-12 of FIG. 11.

A container 16 can be placed on base 11 of push cart 10, as shown in FIGS. 10-12. Container 16 includes an open top end, a bottom 371, and a peripheral wall 377, with a chamber 378 defined by bottom 371 and peripheral wall 377. Bottom 371 of container 16 includes an opening 373 and a closure member 375 provided in opening 373. Closure member 375 can be a zipper, hook and look fasteners, or button and button holes. Thus, opening 373 can be closed or opened by operating closure member 375. Container 16 further includes two retaining pockets 379, with two lateral edges of each retaining pocket 379 sewn to two opposite outer faces of peripheral wall 377, with upper and lower edges of each retaining pocket 379 being open. Container 16 is received in compartment 30 of base 11, with opening 373 of container 16 aligned with slit 46 of lid 40, with guard member 50 and auxiliary guard member 54 received in and restrained by retaining pockets 379, avoiding undesired disengagement of container 16 from base 11. The outermost bag 391 is received in chamber 378 of container 16, with open end 395 of the outermost bag 391 folded back to an outer peripheral face of peripheral wall 377 of container 16 facing away from chamber 378. However, open end 395 of the outermost bag 391 can be retained to peripheral wall 377 of container 16 by any suitable provisions.

Figure 7:
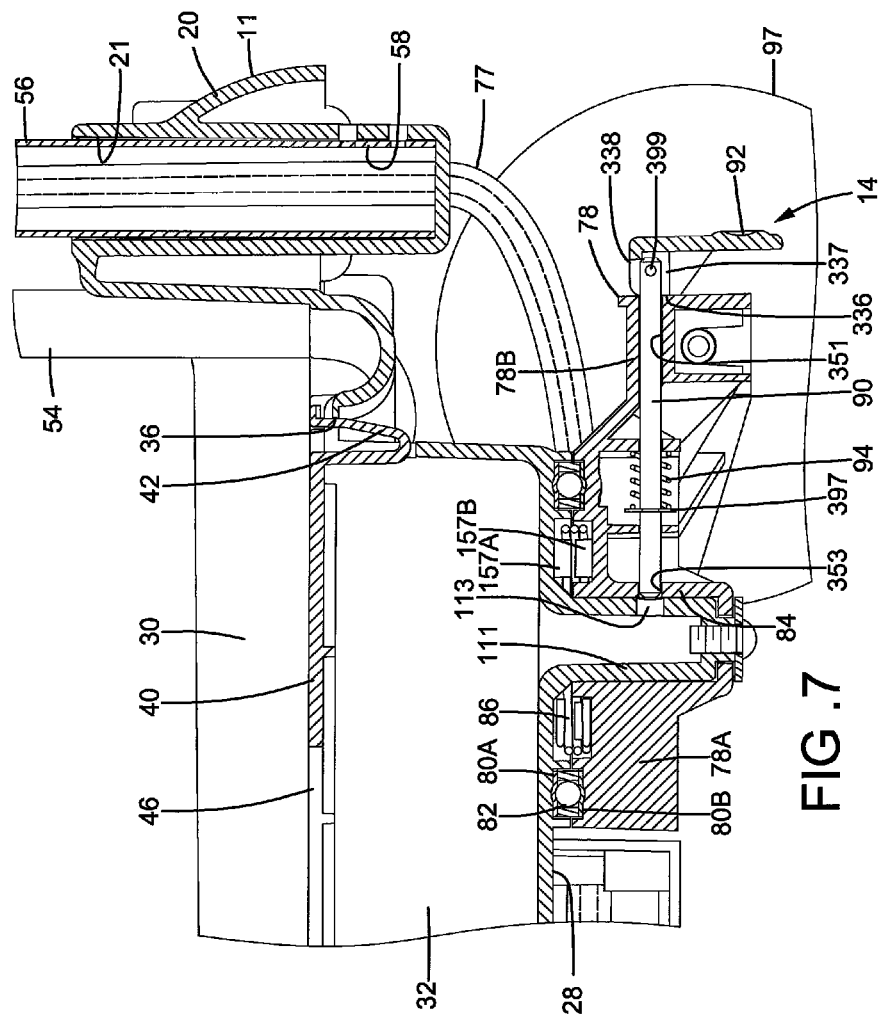
FIG. 7 shows an enlarged view of a portion of the push cart of FIG. 6, with a push plate in a first position.
Figure 8:
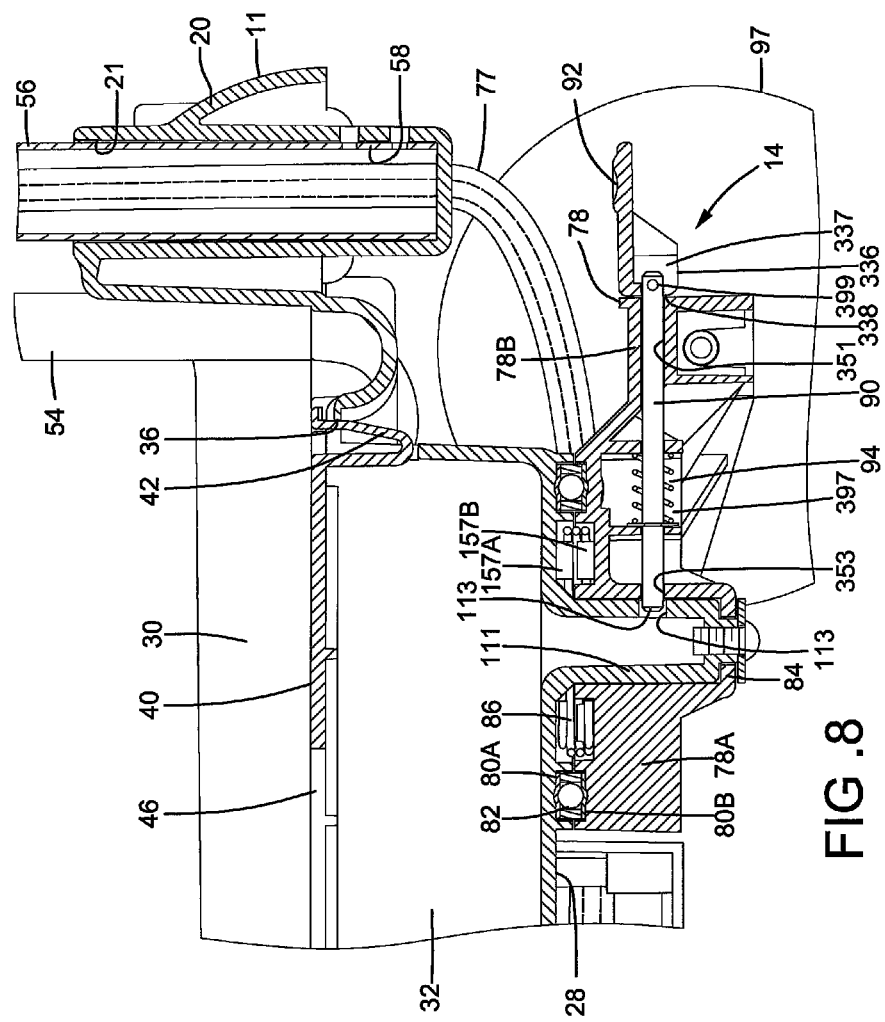
FIG. 8 shows a view similar to FIG. 7, with the push plate in a second position.
Figure 13:
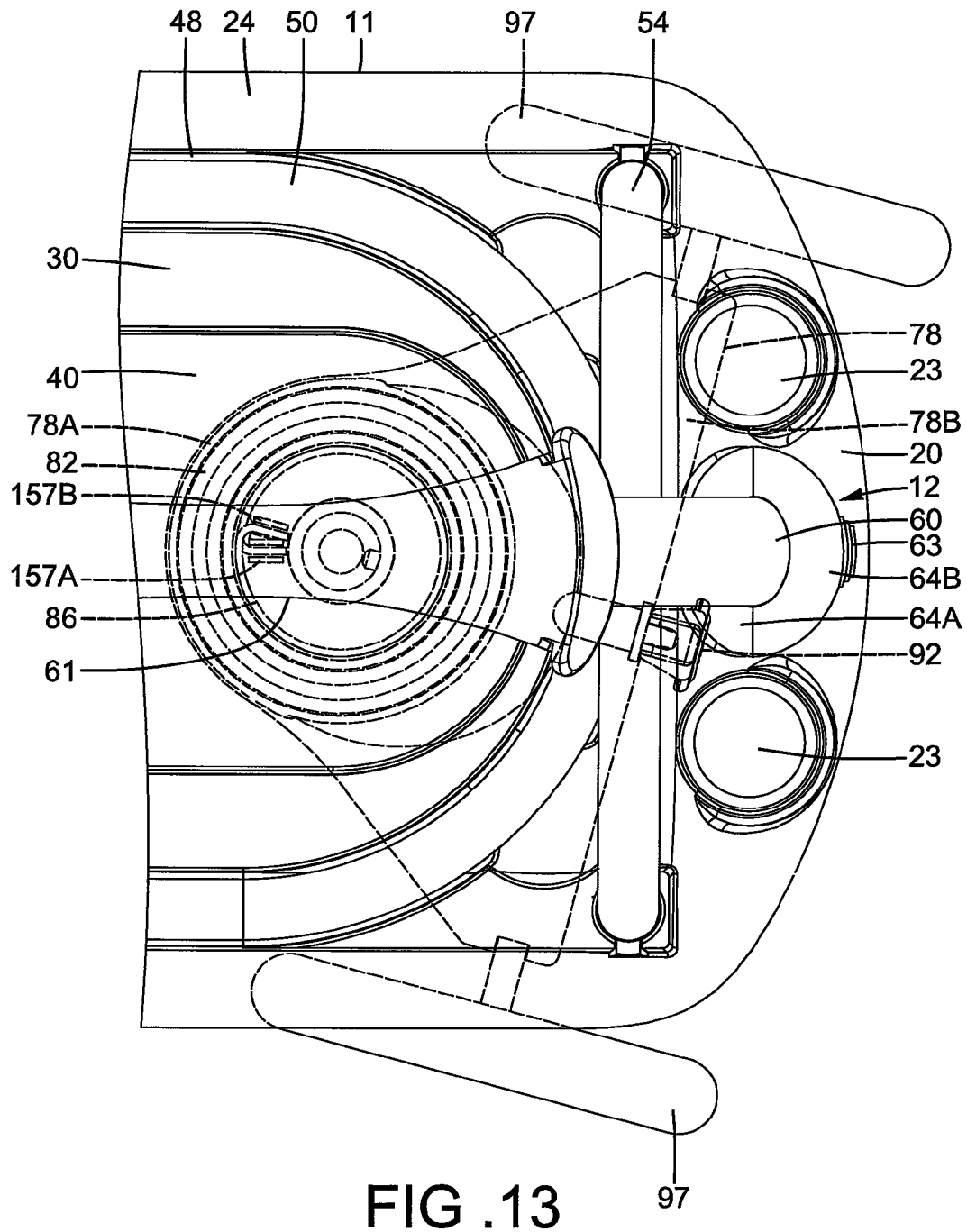
FIG. 13 shows an enlarged view of a portion of the push cart of FIG. 9A, with two wheels at an acute angle to the forward direction of the push cart.

Now that the basic construction of push cart 10 of the present invention has been explained, the operation and some of the advantages of the push cart 10 can be set forth and appreciated. In particular, for the sake of explanation, it will be assumed that push plate 92 is in the first position (FIGS. 5-7), press button 63 is in the engagement position (FIGS. 3 and 6), and control bar 72 is in the releasing position (FIGS. 3 and 6). First surface 336 of push plate 92 in the first position abuts the outer face of seat 78, and the inner end of positioning rod 90 is disengaged from positioning hole 113 of column 111. When a user grips handgrip 61 and applies a force not parallel to the moving direction of push cart 10, seat 78 pivots about the pivot axis defined by column 111 to a position in which wheels 97 are not parallel to wheels 98 (see FIG. 13). Thus, the user can steer push cart 10 to the desired direction. Note that stops 157B twist an end of torsion spring 86 while seat 78 pivots. When the force applied to handgrip 61 vanishes, torsion spring 86 biases seat 78 to its original position in which radial hole 353 of tubular portion 84 aligns with positioning hole 113 of column 111 of base 11 and in which wheels 97 are parallel to wheels 98 again, allowing push cart 10 to move straight.

When press button 63 is in the engagement position (FIG. 3), peg 197 of press button 63 is engaged in one of adjustment holes 315 of sliding tube 60 that is aligned with peg hole 195 of second housing 64B. Thus, sliding tube 60 can not slide relative to stationary tube 56 along third axis Z. When control bar 72 is in the releasing position (FIG. 3), arm 71 abuts operative face 339, and cable 77A is not subjected to force. In this case, first and second braking levers 131 and 132 are disengaged from wheels 98 (FIG. 9B). Thus, wheels 98 can rotate to move push cart 10.

To avoid seat 78 from pivoting about the pivot axis defined by column 111, push plate 92 is pivoted about the pivot axis defined by pivot pin 399 from the first position to the second position while radial hole 353 of seat 78 is aligned with positioning hole 113 of column 111 of base 11, causing second surface 338 of push plate 92 to abut the outer face of seat 78 and causing the inner end of positioning rod 90 to move into positioning hole 113 of column 111 of base 11. Thus, seat 78 is positioned and, thus, can not pivot about the pivot axis defined by column 111. It is not easy to turn push cart 10 in this state. Thus, push cart 10 in this state can serve as a walker cart for the aged or people having difficulties in walking.

When it is desired to adjust the height of handgrip 61 (i.e., the spacing between handgrip 61 and the ground along third axis Z), pressing portion 311 is pressed to pivot press button 63 from the engagement position to the disengagement position (FIG. 14), disengaging peg 197 of press button 63 from adjustment hole 315 of sliding tube 60. Thus, sliding tube 60 can slide relative to stationary tube 56 to adjust the spacing between handgrip 61 and the ground, allowing convenience use by various users having various heights.

Figure 15:
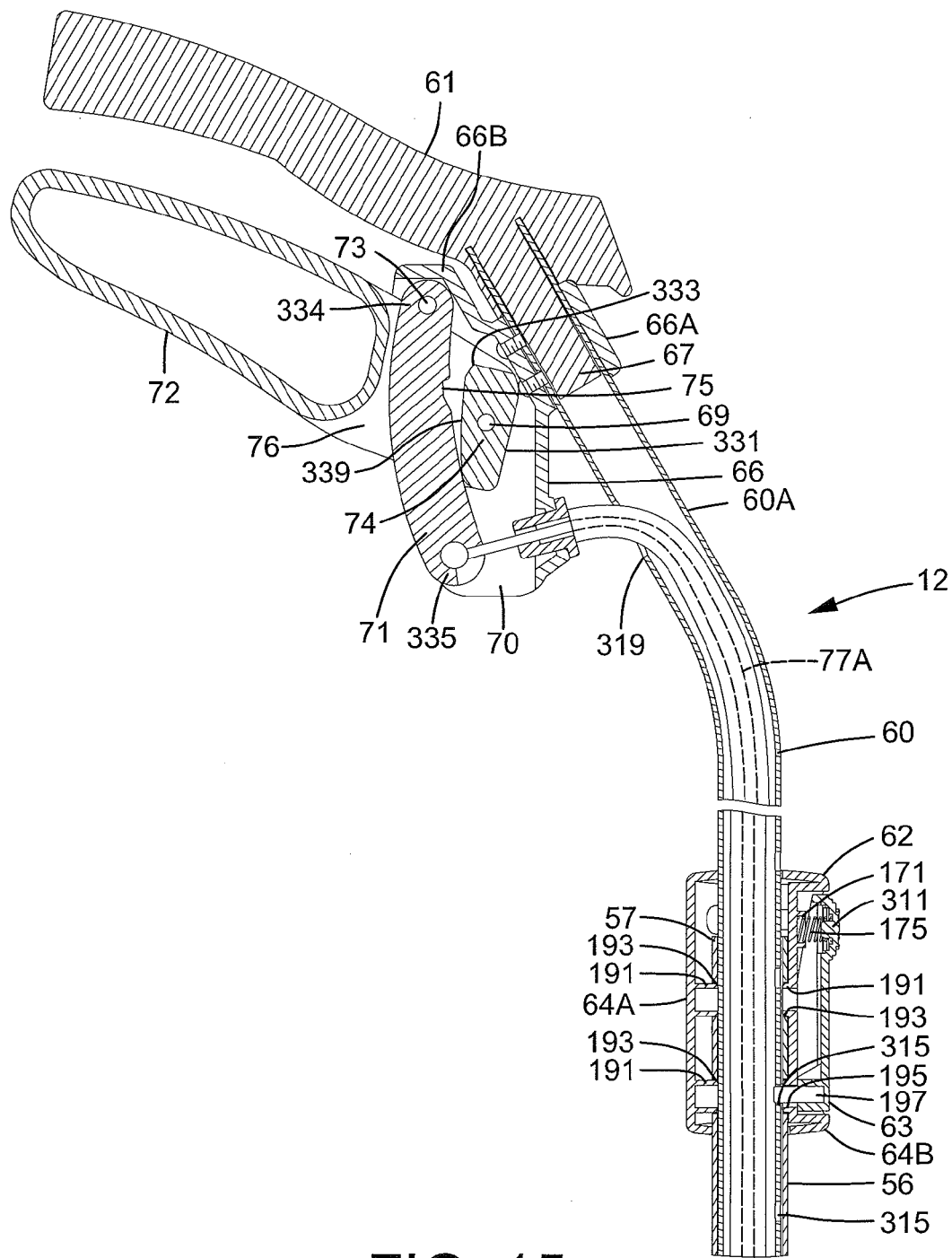
FIG. 15 shows a view similar to FIG. 3, with the control bar in a braking position.
Figure 17:
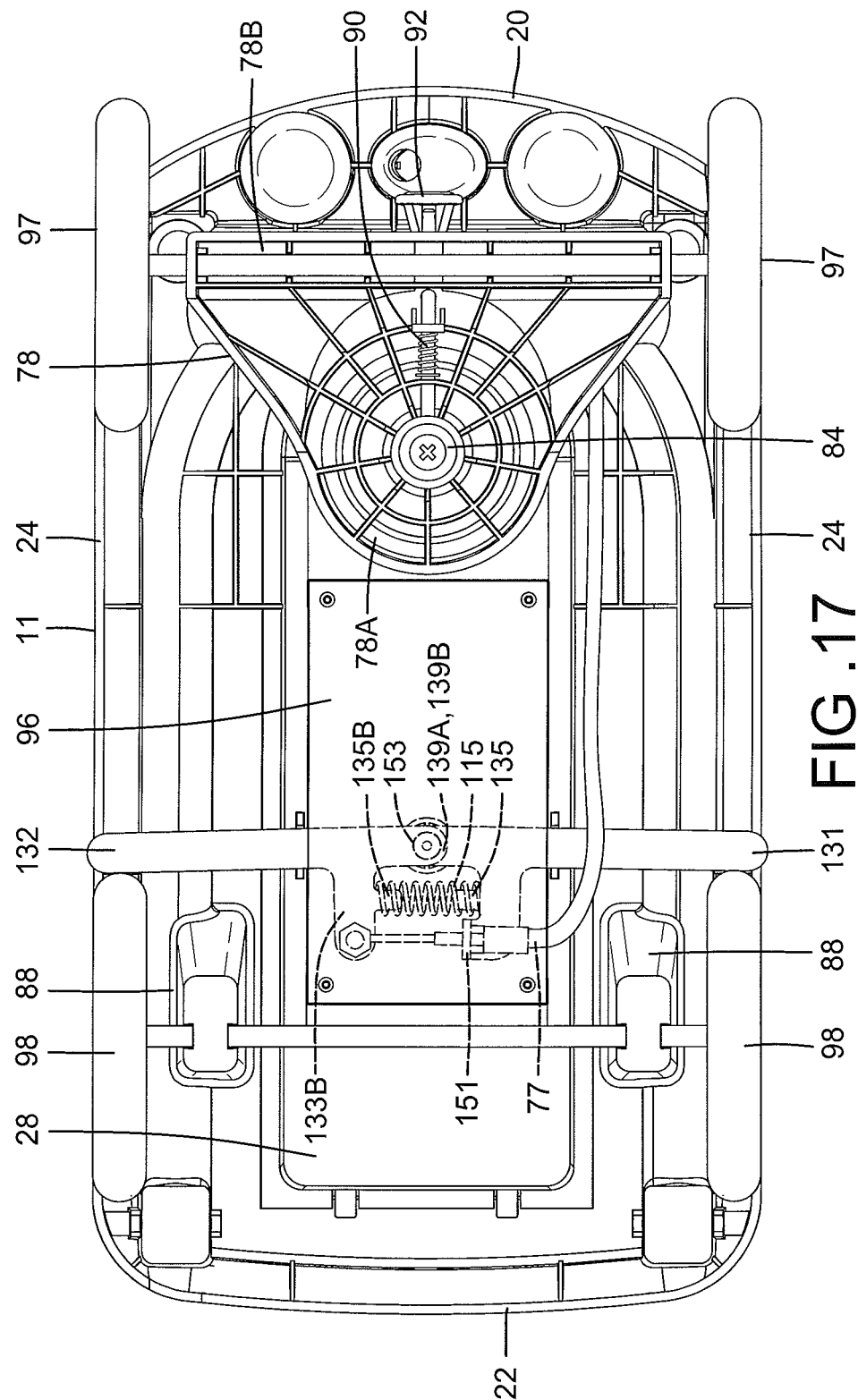
FIG. 17 shows a view similar to FIG. 9B, with first and second braking levers pressing against surfaces of another two wheels.

When it is desired to brake push cart 10, control bar 72 is pulled toward handgrip 61 and, thus, pivoted about the pivot axis defined by first pin 69 from the releasing position (FIG. 6) to the braking position (FIG. 15). Operative face 339 of control bar 72 presses against arm 71, causing arm 71 to pivot about second pin 73. Second end 335 of arm 71 moves away from sliding tube 60 and pulls cable 77A, causing pivotal movement of first and second braking levers 131 and 132 about the pivot axis defined by stub 153. When control bar 72 reaches the braking position, first and second braking levers 131 and 132 press against wheels 98 (FIG. 17), avoiding rotation of wheels 98 and braking push cart 10.

Figure 16:
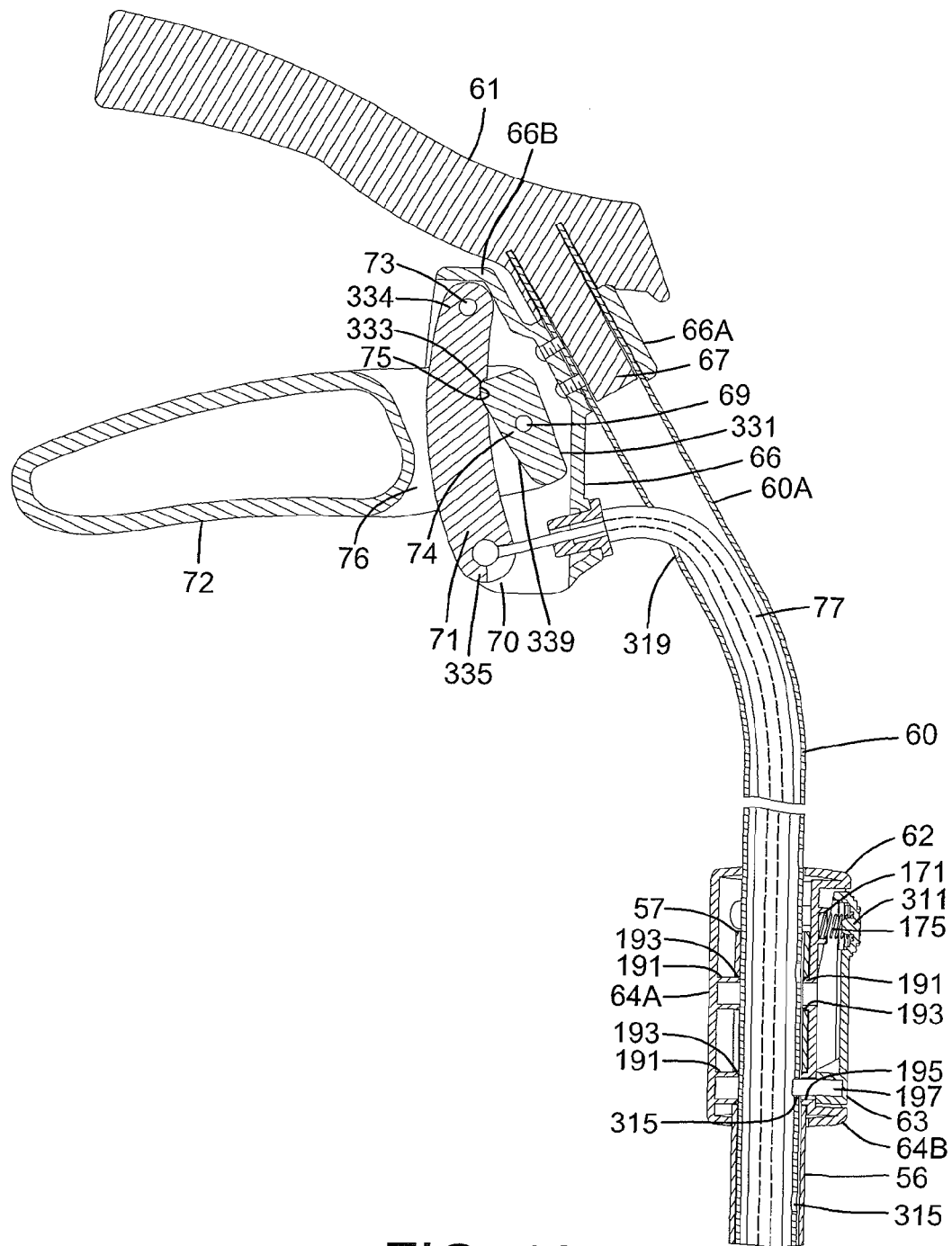
FIG. 16 shows a view similar to FIG. 3, with the control bar in a parking position.

When it is desired to park push cart 10, control bar 72 is pulled away from handgrip 61 and, thus, pivoted from the releasing position (FIG. 6) or braking position (FIG. 15) to the parking position (FIG. 16). Operative face 339 of control bar 72 presses against arm 71, causing arm 71 to pivot about second pin 73 such that second end 335 of arm 71 moves away from sliding tube 60 and pulls cable 77A, further pivoting first and second braking levers 131 and 132 towards wheels 98. When control bar 72 reaches the parking position, chamfered section 333 of operative face 339 of control bar 72 engages with notch 75 of arm 71. Thus, first and second braking levers 131 and 132 reliably press against wheels 98, providing push cart 10 with a parking effect. The force of spring 115 imparted to first and second braking levers 131 and 132 is insufficient to disengage chamfered section 333 of operative face 339 of control bar 72 from notch 75 of arm 71. Thus, control bar 72 can be retained in the parking position.

Figure 18:
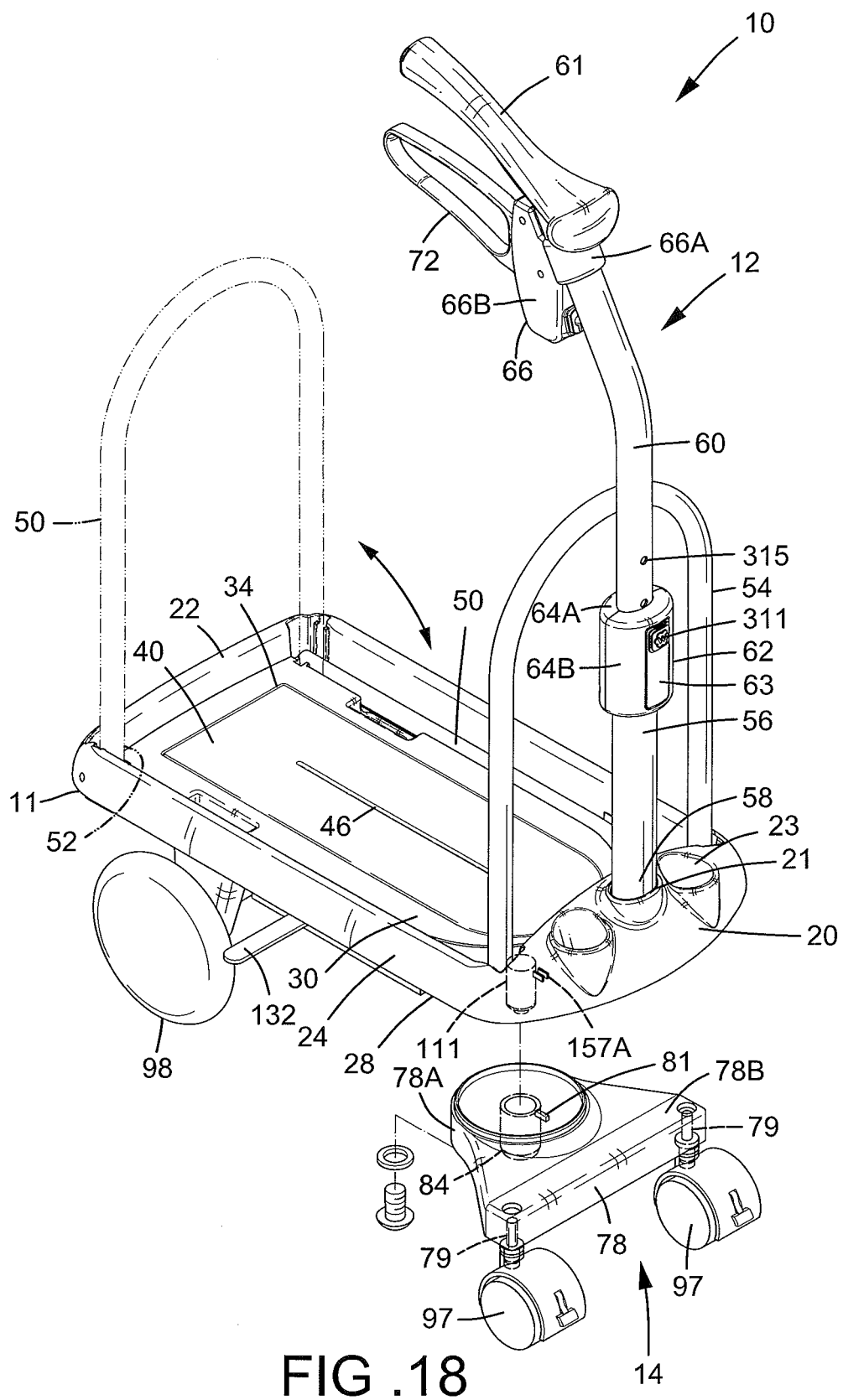
FIG. 18 shows an exploded, perspective view of a push cart of a modified embodiment according to the present invention.

Note that seat 78 can be fixed to bottom side 28 of base 11 and, thus, can not rotate, as shown in FIG. 18. In this example, seat 78 includes a key 81. Furthermore, wheels 97 are in the form of casters each rotatably coupled to an axle 79 received in seat 78. Key 81 is sandwiched between stops 157A. Compared to push cart 10 of FIG. 1-17, push cart 10 of FIG. 18 is more suitable to serve as a shopping cart or peg cart, as the casters can rotate about pivot axes defined by axles 79.

Push cart 10 shown in FIGS. 1-18 is in the form of a shopping cart. However, container 16 placed on push cart 10 can extend utility. As an example, a pet can be placed in container 16, and push cart 10 can serve as a pet cart.

When push caret 10 is used as a shopping cart, commodities can be placed in bag 391 received in chamber 378 of container 16. Bag 391 can be removed from container 16, avoiding container 16 from becoming dirty. Compartment 30 can receive various articles for different utilities. Push cart 10 can serve as a walker cart, as mentioned above.

Now that the basic teachings of the present invention have been explained, many extensions and variations will be obvious to one having ordinary skill in the art. For example, base 11 can include only one groove 23 for receiving an end of an umbrella, a stick, or the like. Base 11 can include only one second engagement grooves 38, and lid 40 can include only one protrusion 44. Handlebar 12 does not have to include fixing member 62 and press button 63. Handlebar 12 can be in the form of a single tube having a lower end engaged in hole 21 of base 11 and, thus, can not provide the height adjustment function. However, the user can still use handlebar 12 to cause movement of push cart 10. Furthermore, push cart 10 does not have to include column 111, and seat 78 does not have to include tubular portion 84. A screw is extended along third axis Z through a washer and seat 78 and extended into bottom side 28 of base 11, fixing seat 78 to bottom side 28 of base 11.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:
1. A push cart comprising:
a base (11) including first and second ends (20, 22) spaced along a first axis (X), two lateral sides (24) spaced from each other along a second axis (Y) perpendicular to the first axis (X), and top and bottom sides (26, 28) spaced along a third axis (Z) perpendicular to the first and second axes (X, Y), with a receiving space (32) defined in the top side (26) of the base (11);
two first wheels (97) and two second wheels (98) supporting the base (11), with the two first wheels (97) located adjacent to the first end (20) of the base (11), with the two second wheels (98) located adjacent to the second end (22) of the base (11), with the two first wheels (97) and the two second wheels (98) rotatable to move the push cart (10);
a lid (40) including a slit (46), with the lid (40) removably mounted to the base (11) and covering the receiving space (32), with the slit (46) in communication with the receiving space (32);
a guard member (50) mounted to the second end (22) of the base (11);
a handlebar (12) mounted to the first end (20) of the base (11);
a handgrip (61) fixed to the handlebar (12);
a container (16) removably placed on the lid (40), with the container (16) including a peripheral wall and having an open top end, with the container (16) further including a bottom opposite to the open top end, with the bottom of the container (16) having an opening (373) aligned with the slit (46) of the lid (40); and a plurality of bags (391), with each of the plurality of bags (391) including a closed end (393) and an open end (395), with the closed end (393) of each of the plurality of bags (391) interconnected to and separable from the open end (395) of an adjacent bag (391), with the plurality of bags (391) coiled and received in the receiving space (32) of the base (11), with a portion of the coiled bags (391) extended through the slit (46) of the lid (40) and the opening (373) of the container (16), with an outermost one of the coiled bags (391) received in the container (16), with the open end (395) of the outermost bag (391) retained to the peripheral wall (377) of the container (16).

2. The push cart as claimed in claim 1, with the base (11) including a compartment (30) defined in the top side (26), with the compartment (30) having a bottom wall, with the receiving space (32) defined in the bottom wall of the compartment (30), with the receiving space (32) having a bottom wall and a peripheral wall extending perpendicularly to the bottom wall of the receiving space (32), with a lip (34) formed on the peripheral wall of the receiving space (32) and located between the bottom wall of the compartment (30) and the bottom wall of the receiving space (32), with the lid (40) removably received in the compartment (30) and resting on the lip (34).

3. The push cart as claimed in claim 2, with the lip (34) including a first engagement groove (36) adjacent to the first end (20) of the base (11), with the lip (34) further including a second engagement groove (38) adjacent to the second end (22) of the base (11), with the lid (40) including upper and lower faces spaced along the third axis (Z), with the slit (46) extending from the upper face through the lower face of the lid (40), with the lid (40) further including a periphery extending between the upper and lower faces, with a resilient engaging plate (42) and a protrusion (44) provided on the periphery of the lid (40), with the resilient engaging plate (42) releasably engaged with the first engagement groove (36) of the base (11), with the protrusion (44) releasably engaged with the second engagement groove (38) of the base (11).

4. The push cart as claimed in claim 1, with a column (111) formed on the bottom side (28) of the base (11) and located adjacent to the first end (20) of the base (11), with the column (111) including a periphery having positioning hole (113), with the push cart further comprising:
  a seat (78) mounted to the bottom side (28) of the base (11), with the seat (78) including an engagement portion (78A) and a shaft coupling portion (78B), with the shaft coupling portion (78B) having an outer face, with the two first wheels (97) rotatably mounted to the shaft coupling portion (78B), with the engagement portion (78A) including a tubular portion (84) having a radial hole (353), with a through-hole (351) extending from the outer face of the shaft coupling portion (78B) to the radial hole (353) of the tubular portion (84), with the tubular portion (84) pivotably receiving the column (111) of the base (11);
  a positioning rod (90) slideably received in the through-hole (351) of the seat (78), with the positioning rod (90) including an inner end received in the radial hole (353) of the seat (78) and an outer end outside of the seat (78); and
  a push plate (92) mounted to the outer end of the positioning rod (90) and pivotable relative to the positioning rod (90) between a first position and a second position, with the push plate (92) including a first surface (336) and a second surface (338) extending perpendicularly to the first surface (336),
  wherein with the push plate (92) in the first position, the first surface (336) abuts against the shaft coupling portion (78B), the inner end of the positioning rod (90) is disengaged from the positioning hole (113) of the column (111) of the base (11), allowing the seat (78) to pivot relative to the base (11) about a pivot axis defined by the column (111), and
  wherein with the push plate (92) in the second position, the second surface (338) abuts against the shaft coupling portion (78B), the inner end of the positioning rod (90) is engaged with the positioning hole (113) of the column (111) of the base (11), preventing the seat (78) from pivoting relative to the base (11).

5. The push cart as claimed in claim 1, with each of the two first wheels (97) being a caster rotatably coupled to an axle (79) received in the seat (78), with the seat (78) including a key (81), with two stops (157A) formed on the bottom side (28) of the base (11), with the key (81) sandwiched between the two stops (157A), preventing the seat (78) from pivoting relative to the base (11).

6. The push cart as claimed in claim 1, with the handlebar (12) including:
  a stationary tube (56) having upper and lower ends (57, 58), with the lower end (58) of the stationary tube (56) fixed to the base (11);
  a sliding tube (60) including an upper section (60A) and a lower section (60B) received in the stationary tube (56), with the sliding tube (60) slideable relative to the stationary tube (56) along the third axis (Z), with the handgrip (61) fixed on the upper section (60A) of the sliding tube (60) outside of the stationary tube (56), with the lower section (60B) including a plurality of adjustment holes (315) spaced along the third axis (Z);
  first and second housings (64A, 64B) fixed around the upper end (57) of the stationary tube (56), with the second housing (64B) including a peg hole (195);
  a press button (63) pivotably mounted to the second housing (64B), with the press button (63) including a peg (197) on an inner face thereof, with the peg (197) received in the peg hole (195) of the second housing (64B), with the press button (63) pivotable between an engagement position and a disengagement position,
  wherein with the press button (63) in the engagement position, the peg (197) is engaged in one of the adjustment holes (315) aligned with the peg hole (195), preventing the sliding tube (60) from sliding relative to the stationary tube (56) along the third axis (Z), and
  wherein with the press button (63) in the disengagement position, the peg (197) is disengaged from the adjustment holes (315), allowing the sliding tube (60) to slide relative to the stationary tube (56) along the third axis (Z).

7. The push cart as claimed in claim 6, with the upper section (60A) of the sliding tube (60) including a radial hole (319), with the push cart further comprising:
  a positioning casing (66) mounted to the upper section (60A) of the sliding tube (60), with the positioning casing (66) including a chamber (70);
  a control bar (72) including a pivotal portion (74) pivotably received in the chamber (70) of the positioning casing (66), with the control bar (72) further including a through-opening (76) delimited by a peripheral wall having an operative face (339) with a chamfered section (333), with the control bar (72) pivotable relative to the positioning casing (66) between a releasing position, a braking position, and a parking position;

an arm (71) received in the chamber (70) of the positioning casing (66), with the arm (71) including first and second ends (334, 335) outside of the control bar (72), with the first end (334) of the arm (71) pivotably connected to the positioning casing (66), with the arm (71) further including an intermediate section between the first and second ends (334, 335) of the arm (71) and received in the through-opening (76) of the control bar (72), with the intermediate section of the arm (71) including a notch (75) facing the operative face (339) of the control bar (72);

first and second braking levers (131, 132) each having a pivotal end (139A, 139B) and an another end, with the pivotal ends (139A, 139B) of the first and second braking levers (131, 132), pivotably mounted to the bottom side (28) of the base (11);

a spring (115) mounted between the first and second braking levers (131, 132), with the spring (115) biasing the other ends of the first and second braking levers (131, 132) away from the two second wheels (98);

a cable (77A) including an upper end (77B) fixed to the second end (335) of the arm (71), with the cable (77A) extending through the radial hole (319) of the sliding tube (60) and extending through the sliding tube (60), with the cable (77A) further including a lower end (77C) fixed to the first and second braking levers (131, 132), wherein with the control bar (72) in the releasing position, the other ends of the first and second braking levers (131, 132) are spaced from the two second wheels (98), a first spacing between the second end (335) of the arm (71) and the sliding tube (60) while the control bar (72) is in the releasing position is smaller than a second spacing between the second end (335) of the arm (71) while the control bar (72) is in the braking or parking position, wherein with the control bar (72) moved to the parking position, the first and second braking levers (131, 132) pivot to compress the spring (115), the other ends of the first and second braking levers (131, 132) press against the two second wheels (98) to brake the push cart (10), the other ends of the first and second braking levers (131, 132) disengage from the two second wheels (98) under action of the spring (115) if the control bar (72) is released, wherein with control bar (72) in the parking position, the notch (75) of the arm (71) engaged with the chamfered section (333) of the control bar (72), the other ends of the first and second braking levers (131, 132) press against the two second wheels (98) to park the push cart (10), the spring (115) is incapable of moving the other ends of the first and second braking levers (131, 132) to disengage from the two second wheels (98) if the control bar (72) is released.

\* \* \* \* \*